United States Patent
Chang et al.

(10) Patent No.: US 8,090,206 B2
(45) Date of Patent: Jan. 3, 2012

(54) SYSTEMS AND METHODS FOR MATCHING IMAGES

(75) Inventors: Chih-Kuang Chang, Taipei Hsien (TW); Xian-Yi Chen, Shenzhen (CN); Li Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 854 days.

(21) Appl. No.: 12/166,269

(22) Filed: Jul. 1, 2008

(65) Prior Publication Data
US 2009/0010550 A1    Jan. 8, 2009

(30) Foreign Application Priority Data
Jul. 6, 2007   (CN) .......................... 2007 1 0201025

(51) Int. Cl.
*G06K 9/62* (2006.01)

(52) U.S. Cl. .................................................. 382/209

(58) Field of Classification Search ............... 382/209, 382/218, 278, 282
See application file for complete search history.

(56) References Cited

U.S. PATENT DOCUMENTS

| | | | | |
|---|---|---|---|---|
| 5,912,988 A | * | 6/1999 | Moore | 382/209 |
| 7,212,609 B2 | * | 5/2007 | Nagamine et al. | 378/65 |
| 7,822,259 B2 | * | 10/2010 | Pop et al. | 382/141 |
| 7,920,714 B2 | * | 4/2011 | O'Neil | 382/100 |
| 2002/0064310 A1 | | 5/2002 | Braspenning et al. | |

* cited by examiner

*Primary Examiner* — Daniel Mariam
(74) *Attorney, Agent, or Firm* — Altis Law Group, Inc.

(57) ABSTRACT

A method for matching images is disclosed. The method includes selecting a template image and a target image from a batch of images and sampling the template image so as to obtain a template-sampled image, and sampling the target image so as to obtain a target-sampled image, wherein the sampling of both the template image and the target image is according to a sample interval. The method further includes matching the template-sampled image and the target-sampled image, and matching the template image and the target image, if the template-sampled image and the target-sampled image are matched successfully.

4 Claims, 5 Drawing Sheets

SYSTEMS AND METHODS FOR MATCHING IMAGES

BACKGROUND OF THE INVENTION

1. Field of the Invention

Embodiments of the present disclosure relate to matching images, and more particularly to systems and methods for matching images.

2. Description of Related Art

Quality control is very important in manufacturing products in large quantities. In order to ensure high quality products, an image of a manufactured product is analyzed and compared against an image of a prototype so as to evaluate the quality of the manufactured product.

In analyzing the manufactured product, a section of the image, known as a measure target, of the manufactured product is compared against a similar section of the image of the prototype to evaluate a quality of the manufactured product.

However, selecting the measure target is often implemented manually. If multiple images of manufactured products need to be analyzed, it is difficult and time-consuming to manually locate the measure target for each of the images. Additionally, since the measured target of the manufactured product may vary in size and shape compared to the image of the prototype, quality control may suffer.

What is needed, therefore, is a method which can quickly match images in order to locate a measure target for each of matched images.

SUMMARY OF THE INVENTION

In one aspect, a computer-based method for matching images is provided. The method comprises: selecting a template image and a target image from a batch of images to be analyzed, and determining parameters for the template image and the target image, wherein the parameters comprises a current correlation coefficient Cn between the template image and the target image, and initial coordinates of an optimal offset point p1 in the target image; determining a sample interval of the template image and the target image; sampling the template image so as to obtain a template-sampled image, and sampling the target image so as to obtain a target-sampled image, wherein the sampling of both the template image and the target image is according to the sample interval; matching the template-sampled image and the target-sampled image; and matching the template image and the target image, if the template-sampled image and the target-sampled image are matched successfully.

In another aspect, a computer-readable medium having stored thereon instructions for matching images, the computer-readable medium when executed by a computer, causes the computer to: selecting a template image and a target image from a batch of images to be analyzed, and determining parameters for the template image and the target image, wherein the parameters comprises a current correlation coefficient Cn between the template image and the target image, and initial coordinates of an optimal offset point p1 in the target image; determining a sample interval of the template image and the target image; sampling the template image so as to obtain a template-sampled image, and sampling the target image so as to obtain a target-sampled image, wherein the sampling of both the template image and the target image is according to the sample interval; matching the template-sampled image and the target-sampled image; and matching the template image and the target image, if the template-sampled image and the target-sampled image are matched successfully.

Other advantages and novel features will become more apparent from the following detailed description certain embodiments of the present disclosure when taken in conjunction with the accompanying drawings, in which:

DETAILED DESCRIPTION OF THE INVENTION

All of the processes described below may be embodied in, and fully automated via, software code modules executed by one or more general purpose computers or processors. The code modules may be stored in any type of computer-readable medium or other computer storage device. Some or all of the methods may alternatively be embodied in specialized computer hardware.

Figure 1:
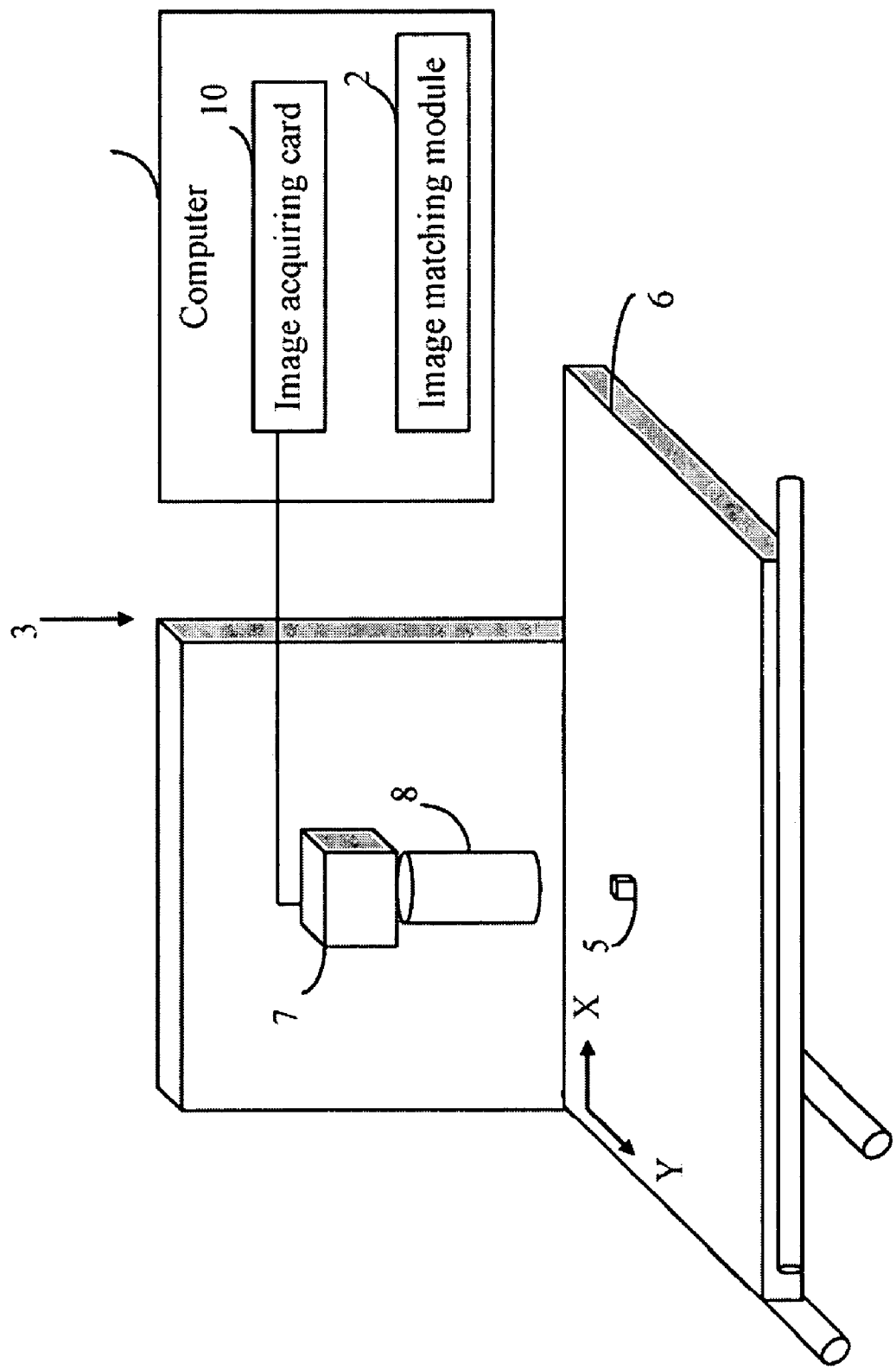
FIG. 1 is a schematic diagram of one embodiment of an application environment for matching images of the present disclosure.

FIG. 1 is a schematic diagram of one embodiment of an application environment 3 for matching images of the present disclosure. In one embodiment, the application environment 3 includes a computer 1 and a measuring machine 6, which an object 5 is placed thereon. A charge coupled device (CCD) 7 and a lens 8 may be positioned on a Z-axis of the measuring machine 6. The CCD 7 is used for capturing an image of the object 5 through the lens 8.

The computer 1 includes an image matching module 2 and an image acquiring card 10. The image acquiring card 10 is connected with the CCD 7 through a cable, and acquires an image from the object 5 using the CCD 7. The image acquired by the image acquiring card 10 can be shown on the screen of a display of the computer 1.

Figure 2:
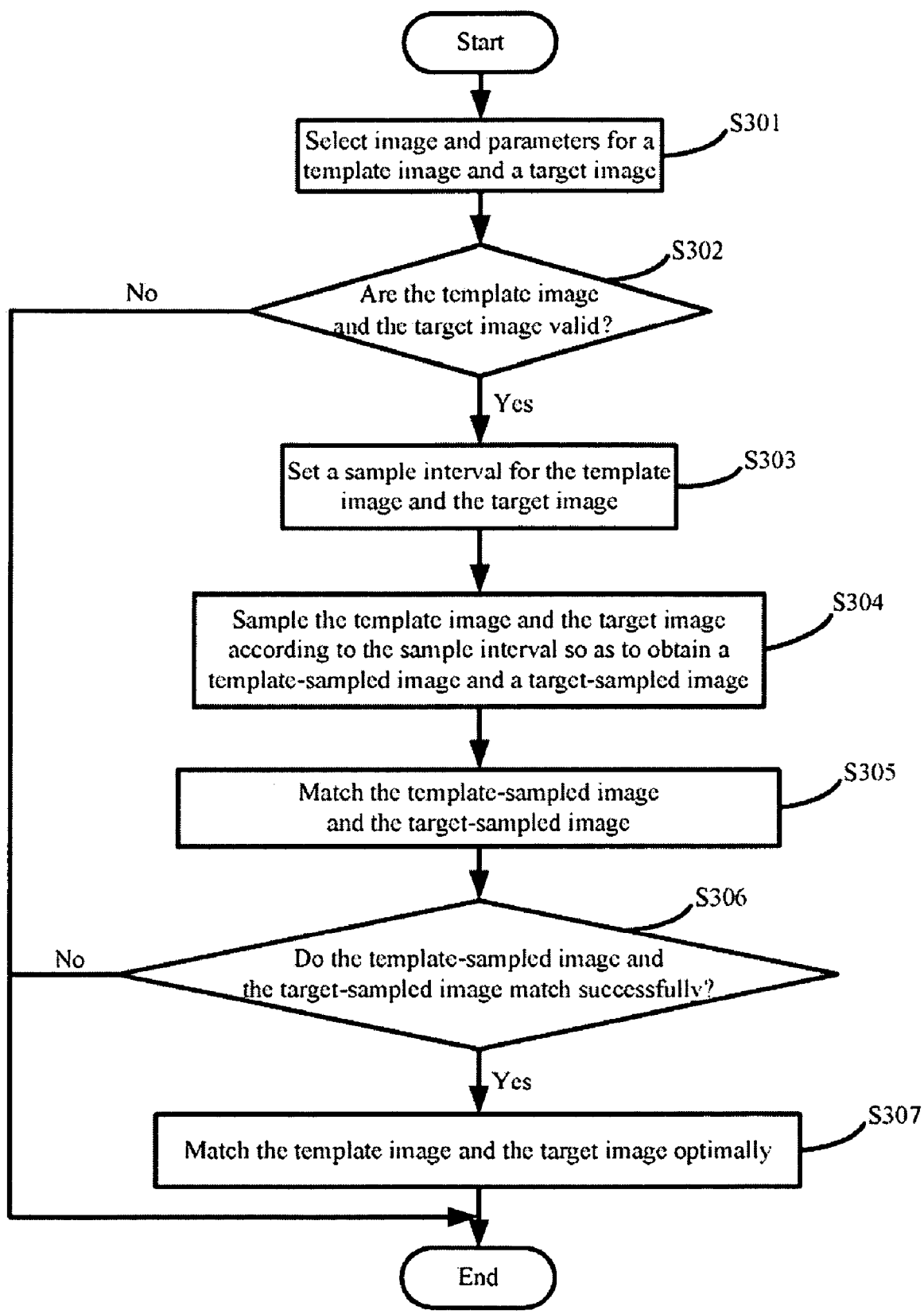
FIG. 2 is a flowchart illustrating one embodiment of a method for matching images by utilizing the application environment of FIG. 1.

FIG. 2 is a flowchart illustrating one embodiment of a method for matching images utilizing the application environment 3 of FIG. 1. The method of FIG. 2 may be used to match a batch of images acquired by the image acquiring card 10 against one or more prototype images. Depending on the embodiment, additional blocks may be added, others removed, and the ordering of the blocks may be changed.

In block S301, an image or a part of an image from a manufactured product is manually selected to serve as a template image. For the purpose of illustration and simplicity, the method of FIG. 2 focuses on manually selecting a part of the image to serve as the template image. It may be understood that a similar process may take place when manually selecting a whole image (i.e., not a section of the image) from the batch of images to be analyzed. Next, another image from the batch of images is manually selected to serve as a target image. Afterwards, parameters are configured for the template image and the target image. The parameters may include a current correlation coefficient Cn between the template image and the target image, and initial coordinates of an optimal offset point p1 in the target image. It may be understood that the correlation coefficient Cn defines a minimum degree of association between the template image and the target image. In one embodiment, the template image and the target image are matched successfully, only when a degree of association between the template image and the target image is greater than the minimum degree of association. The initial coordinates of p1 are usually set as nonexistent coordinates in a coordinate axis system. In the embodiment of FIG. 2, the initial coordinates of p1 are set as (−1,−1) for purposes of explanation.

In block S302, the image matching module 2 determines if both the template image and the target image are valid images. In one embodiment, a length and a width of each of the images (i.e., the template image and the target image) should be at least 11 pixels in order to be valid images. Specifically, the image matching module 2 obtains a length and a width of the template image, and a length and a width of the target image, and determines whether the length and the width of the template image and the length and width of the target image are each at least 11 pixels.

If the template image and the target image are both valid images, then in block S303, the image matching module 2 sets a sample interval of the template image and the target image. It may be understood that the sample interval corresponds to an interval or a set of intervals at a point in time and/or space of the template image and the target image. The same sample interval may be used to sample the template image and the target image, wherein sampling refers to a reduction in a continuous-time signal to a discrete-time signal.

In block S304, the image matching module 2 samples the template image and the target image according to the sample interval, so as to obtain a template-sampled image and a target-sampled image respectively.

Figure 3:
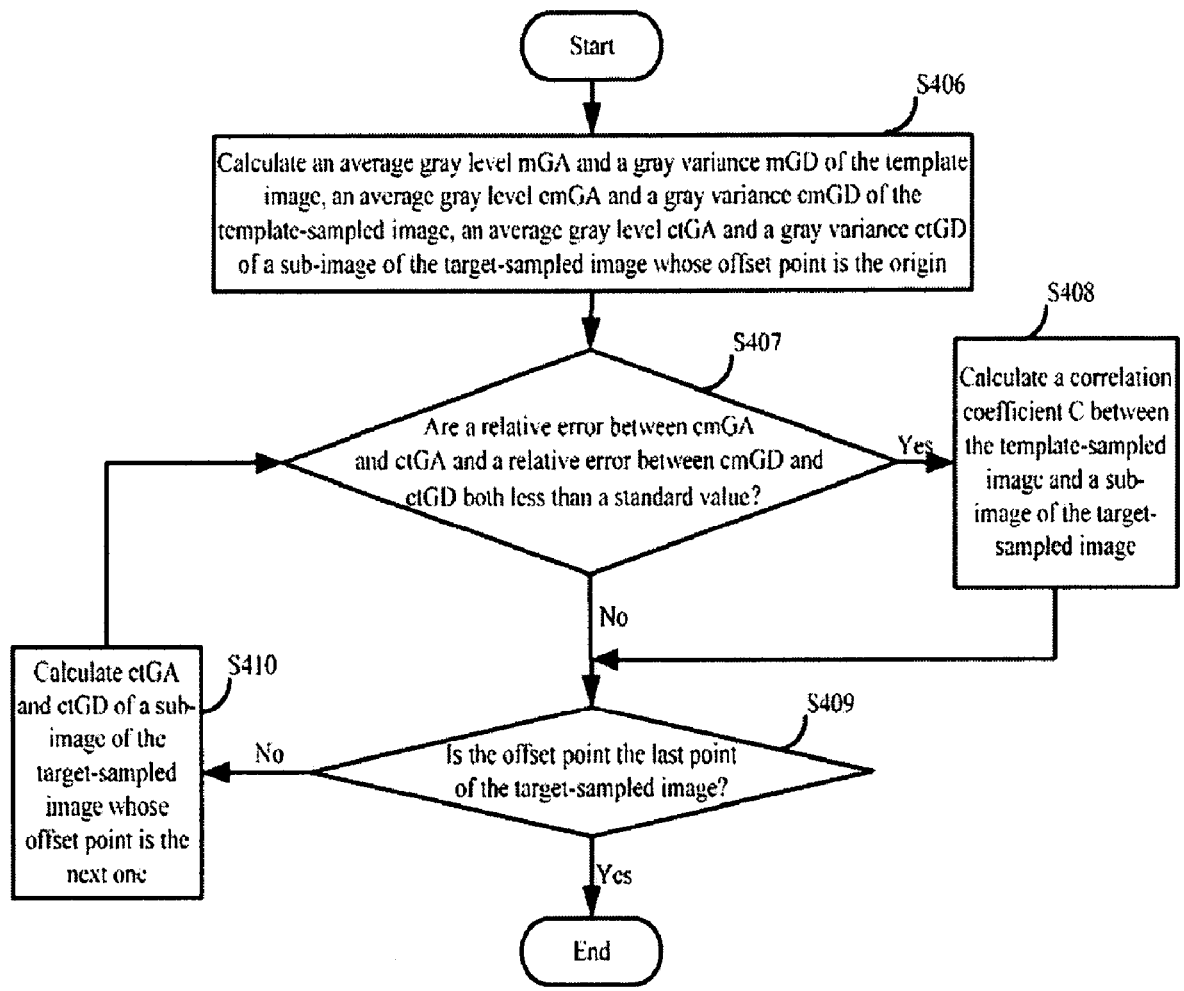
FIG. 3 is a flowchart illustrating one embodiment of the image matching module matching the template-sampled image and the target-sampled image of FIG. 2.

In block S305, the image matching module 2 matches the template-sampled image and the target-sampled image as will be further explained herein with respect to FIG. 3.

In block S306, the image matching module 2 determines if the template-sampled image and the target-sampled image match each other successfully. As mentioned above, the template-sampled image and the target-sampled image match each other successfully when the coordinates of p1 are not (−1,−1).

If the template-sampled image and the target-sampled image match each other successfully (i.e., the coordinates of p1 are not (−1,−1)), then in block S307, the image matching module 2 matches the template image and the target image. Further details of the image matching module 2 matching the template image and the target image are described with respect to FIG. 4.

Otherwise, if the template-sampled image and the target-sampled image do not match each other successfully in the block S306 (i.e., the coordinates of p1 are still (−1,−1)), then the procedure ends.

In the block S302, if either of the template image and the target image is not valid images, then the procedure ends.

FIG. 3 is a flowchart illustrating one embodiment of the image matching module 2 matching the template-sampled image and the target-sampled image of FIG. 2. As mentioned above, the flowchart comprises details of block S305. Depending on the embodiment, additional blocks may be added, others removed, and the ordering of the blocks may be changed.

Figure 5:
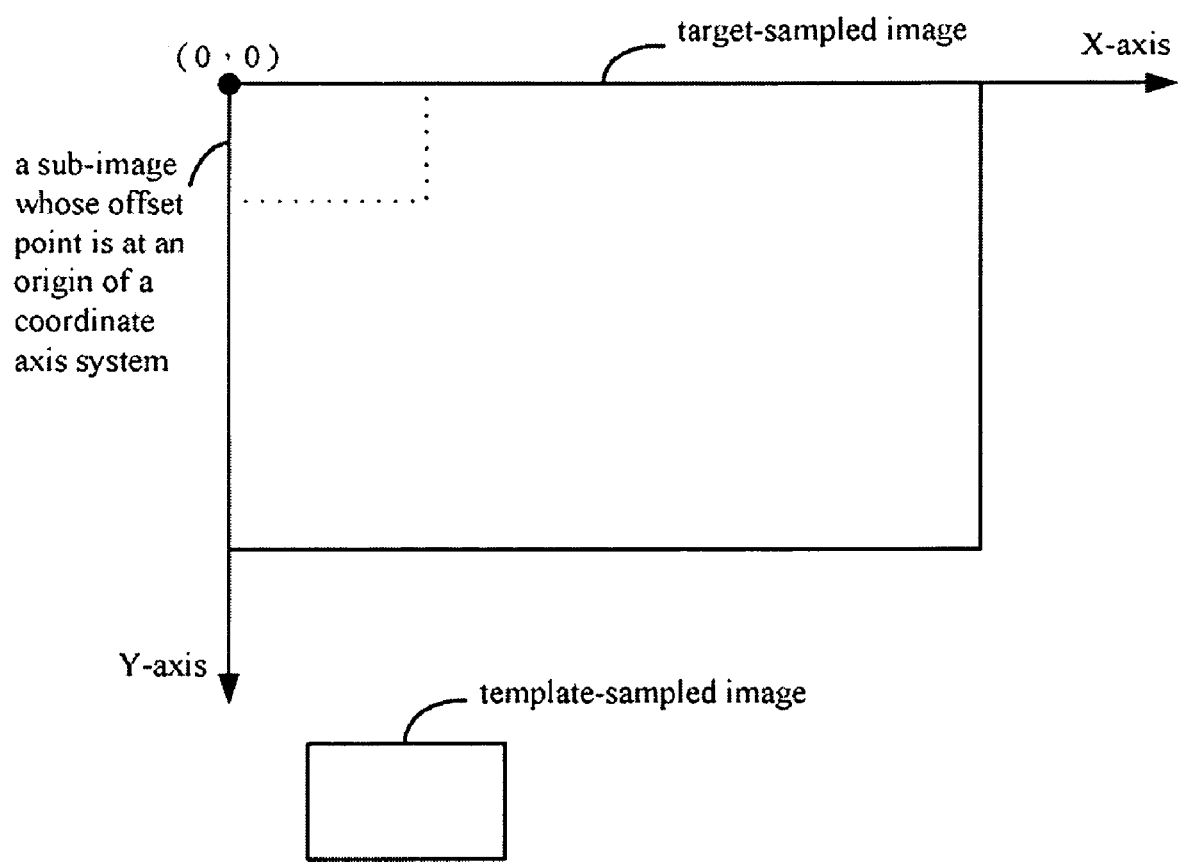
FIG. 5 illustrates one embodiment of a sub-image of a target-sampled image whose offset point is at an origin of a coordinate axis system.

In block S406, the image matching module 2 calculates an average gray level mGA and a gray variance mGD of the template image. Furthermore, the image matching module 2 calculates an average gray level cmGA and a gray variance cmGD of the template-sampled image. Then, the image matching module 2 determines a sub-image of the target-sampled image whose offset point is at an origin (e.g., (0,0)) of a coordinate axis system. The sub-image has the same length and width as the template-sampled image (referring to FIG. 5). The image matching module 2 calculates an average gray level ctGA and a gray variance ctGD of the sub-image.

In one embodiment, a method for calculating a value of mGA is as follows. The image matching module 2 obtains coordinate values for each pixel of the template image. Then, the image matching module 2 obtains a gray level of each pixel according to each of the coordinate values. Next, the image matching module 2 calculates an average value for the gray level of each pixel and assigns it as the average gray level mGA of the template image. In one embodiment, a method for calculating cmGA, ctGA may be substantially the same as the method for calculating mGA.

In one embodiment, a formula for calculating mGD is:

$$mGD = \frac{\sum_{i=0}^{n}(\text{Pixel}(i) - mGA)^2}{l * w}.$$

In above formula, l denotes a length of the template image, w denotes a width of the template image, and Pixel(i) denotes a gray level of each pixel of the template image. In one embodiment, formulas for calculating cmGD, ctGD are similar to the above formula for calculating mGD.

In block S407, the image matching module 2 determines if a relative error between a value of cmGA and a value of ctGA and a relative error between a value of cmGD and a value of ctGD are both less than a standard value. Depending on the embodiment, the standard value may be set by a user of the image matching module 2 or be defaulted a default number. In one embodiment, the default number may be 0.5.

If the relative error between the value of cmGA and the value of ctGA, and the relative error between the value of cmGD and the value of ctGD are both less than the standard value, then in block S408, the image matching module 2 calculates a correlation coefficient C between the template-sampled image and a sub-image of the target-sampled image. The correlation coefficient C may be calculated according to the value of cmGA, the value of ctGA, the value of cmGD, and the value of ctGD. Next, the image matching module 2 compares a value of C with a value of Cn. Furthermore, the image matching module 2 replaces the value of Cn with the value of C, and replaces the coordinates of p1 with coordinates of an offset point corresponding to the value of C, if the value of C is greater than the value of Cn.

Otherwise, if either of the relative error between the value of cmGA and the value of ctGA, and the relative error between the value of cmGD and the value of ctGD is not less than the standard value, in block S409, the image matching module 2 judges whether the offset point is a last point of the target-sampled image. In other words, the image matching module 2 determines if the coordinates of the offset point are maximum in the target-sampled image.

If the offset point is not the last point of the target-sampled image, then in block S410, the image matching module 2 calculates an average gray level ctGA and a gray variance ctGD of a sub-image of the target-sampled image whose offset point is the next one (referring to block S406). Then the procedure returns to the block S407. In one embodiment, selection of a next offset point may be sequentially selected by going top to bottom and left to right of pixels of the target-sampled image.

Otherwise, in the block S409, if the offset point is the last point of the target-sampled image, then the procedure ends.

Figure 4:
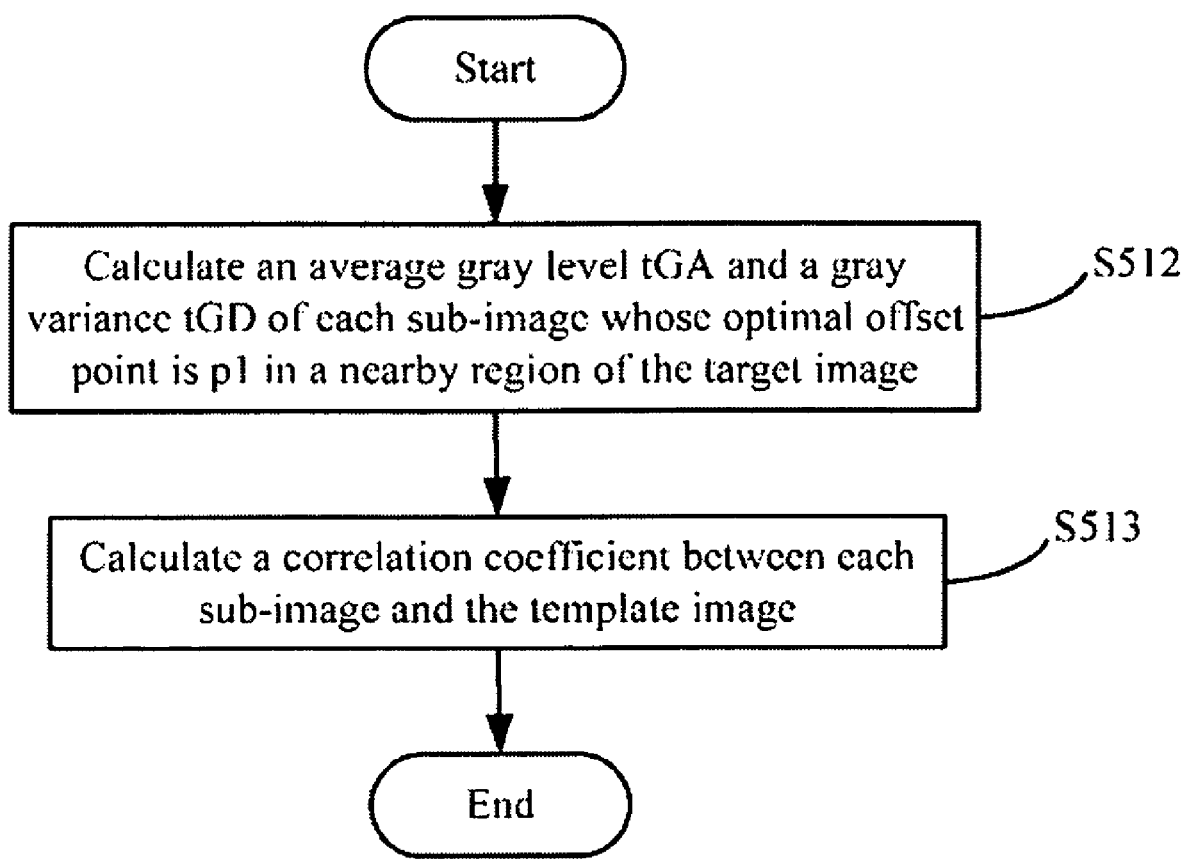
FIG. 4 is a flowchart illustrating one embodiment of the image matching module matching the template image and the target image.

FIG. 4 is a flowchart illustrating one embodiment of the image matching module 2 matching the template image and the target image. As mentioned above, the flowchart comprises details of block S307. Depending on the embodiment, additional blocks may be added, others removed, and the ordering of the blocks may be changed.

In block S512, the image matching module 2 calculates an average gray level tGA and a gray variance tGD of each sub-image whose optimal offset point is the coordinates of p1 in a nearby region of the target image (referring to block S406). In detail, the image matching module 2 first acquires points between the coordinates of p1 and its adjacent sampled point of the target image. Next, the image matching module 2 determines all sub-images whose optimal offset point are the points, and then calculates a value of tGA and a value of tGD for each of the sub-images. For example, if a coordinate value of p1 is (0,3) and a sample interval is 2, then sub-images, whose optimal offset point is p1 in nearby region of the target image, are sub-images whose offset point are (0,1), (0,2), (0,4), (0,5), (1,3), (2,3).

In block S513, the image matching module 2 calculates a correlation coefficient C between each sub-image and the template image according to the value of mGA, the value of tGA, the value of mGD, and the value of tGD. Next, the image matching module 2 obtains a maximum correlation coefficient C from all the correlation coefficients, compares the value of C with the value of Cn. Furthermore, the image matching module 2 replaces the value of Cn with the value of C, and replaces the coordinates of p1 with the coordinates of the offset point corresponding to the value of C, if the value of C is greater than the value of Cn.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-based method for matching images, the method comprising:

selecting a template image and a target image from a batch of images to be analyzed, and determining parameters for the template image and the target image, wherein the parameters comprises a current correlation coefficient Cn between the template image and the target image, and initial coordinates of an optimal offset point p1 in the target image;

determining a sample interval of the template image and the target image;

sampling the template image so as to obtain a template-sampled image, and sampling the target image so as to obtain a target-sampled image, wherein the sampling of both the template image and the target image is according to the sample interval;

matching the template-sampled image and the target-sampled image, the matching step comprising steps (a)-(d):

(a) calculating an average gray level cmGA and a gray variance cmGD of the template-sampled image, and calculating an average gray level ctGA and a gray variance ctGD of a sub-image of the target-sampled image, wherein the target-sampled image has an offset point at an origin of a coordinate axis system;

(b) determining a standard value for a relative error between the average gray level cmGA and the average gray level ctGA and for a relative error between the gray variance cmGD and the gray variance ctGD, and calculating a correlation coefficient C between the template-sampled image and the sub-image of the target-sampled image, if the relative error between cmGA and ctGA and the relative error between cmGD and ctGD are both less than the standard value;

(c) replacing Cn with C and replacing the coordinates of p1 with coordinates of an offset point corresponding to C, if C is greater than Cn; and (d) calculating an average gray level ctGA and a gray variance ctGD of a sub-image of the target-sampled image whose offset point is the next one, and repeating block (b) to block (d) until the offset point is the last point of the target-sampled image, if either of the relative error between cmGA and ctGA and the relative error between cmGD and ctGD is not less than the standard value; and matching the template image and the target image, if the template-sampled image and the target-sampled image are matched successfully.

2. The method according to claim 1, wherein the next offset point is sequentially selected by going top to bottom and left to right of pixels of the target-sampled image.

3. The method according to claim 1, wherein the block of matching the template image and the target image comprises:

calculating an average gray level tGA and a gray variance tGD of each sub-image whose optimal offset point is p1 in nearby region of the target image;

calculating a correlation coefficient C between each sub-image and the template image according to an average gray level of the template image mGA, tGA, a gray variance of the template image mGD, and tGD, and obtaining a maximum correlation coefficient C from all the correlation coefficients; and replacing Cn with C and replacing the coordinates of p1 with coordinates of an offset point corresponding to the maximum correlation coefficient C, if C is greater than Cn.

4. A non-transitory computer-readable medium having stored thereon instructions for matching images, the computer-readable medium, when executed by a computer, causes the computer to:

selecting a template image and a target image from a batch of images to be analyzed, and determining parameters for the template image and the target image, wherein the parameters comprises a current correlation coefficient Cn between the template image and the target image, and initial coordinates of an optimal offset point p1 in the target image;

determining a sample interval of the template image and the target image;

sampling the template image so as to obtain a template-sampled image, and sampling the target image so as to obtain a target-sampled image, wherein the sampling of both the template image and the target image is according to the sample interval;

matching the template-sampled image and the target-sampled image, the matching step comprising steps (a)-(d):

(a) calculating an average gray level cmGA and a gray variance cmGD of the template-sampled image, and calculating an average gray level ctGA and a gray variance ctGD of a sub-image of the target-sampled image, wherein the target-sampled image has an offset point at an origin of a coordinate axis system;

(b) determining a standard value for a relative error between the average gray level cmGA and the average gray level ctGA and for a relative error between the gray variance cmGD and the gray variance ctGD, and calculating a correlation coefficient C between the template-sampled image and the sub-image of the target-sampled image, if the relative error between cmGA and ctGA and the relative error between cmGD and ctGD are both less than the standard value;

(c) replacing Cn with C and replacing the coordinates of p1 with coordinates of an offset point corresponding to C, if C is greater than Cn; and (d) calculating an average gray level ctGA and a gray variance ctGD of a sub-image of the target-sampled image whose offset point is the next one, and repeating block (b) to block (d) until the offset point is the last point of the target-sampled image, if either of the relative error between cmGA and ctGA and the relative error between cmGD and ctGD is not less than the standard value; and matching the template image and the target image, if the template-sampled image and the target-sampled image are matched successfully.

* * * * *